(12) United States Patent
Kiura

(10) Patent No.: US 9,398,208 B2
(45) Date of Patent: Jul. 19, 2016

(54) IMAGING APPARATUS AND IMAGING CONDITION SETTING METHOD AND PROGRAM

(75) Inventor: Mikio Kiura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 401 days.

(21) Appl. No.: 13/983,295

(22) PCT Filed: Jan. 31, 2012

(86) PCT No.: PCT/JP2012/000599
§ 371 (c)(1),
(2), (4) Date: Aug. 1, 2013

(87) PCT Pub. No.: WO2012/105228
PCT Pub. Date: Aug. 9, 2012

(65) Prior Publication Data
US 2013/0307976 A1    Nov. 21, 2013

(30) Foreign Application Priority Data

Feb. 4, 2011    (JP) .................................. 2011-023118

(51) Int. Cl.
*H04N 5/232*    (2006.01)
*G06K 9/20*    (2006.01)
(Continued)

(52) U.S. Cl.
CPC .......... *H04N 5/23216* (2013.01); *G06K 9/2027* (2013.01); *H04N 5/232* (2013.01); *G06K 2209/19* (2013.01); *H04N 5/23222* (2013.01)

(58) Field of Classification Search
CPC .......... H04N 13/0239; H04N 13/0055; H04N 13/0296; H04N 13/0497; H04N 13/0242; H04N 7/181; H04N 7/183; H04N 7/18; H04N 7/188; G08B 13/19656; A61B 5/055; A61B 6/032; A61B 3/113; A61B 6/5205; A61B 5/7275; A61B 5/7278; A61B 6/037; A61B 1/00009; A61B 2560/0475; A61B 3/0025; A61B 3/112; A61B 5/0261; A61B 5/14546; A61B 5/14551
See application file for complete search history.

(56) References Cited

U.S. PATENT DOCUMENTS

2004/0037474 A1* 2/2004 Happel .................. G06K 9/481
382/280
2004/0165775 A1* 8/2004 Simon .................. G06T 7/0018
382/181

(Continued)

OTHER PUBLICATIONS

Joachim Denzler, Christopher M. Brown "information Theoretic Sensor Data Selection for Active Object Recognition and State Estimation", IEEE Transactions on Pattern Analysis and Machine Intelligence, vol. 24, Issue 2 (Feb. 2002), pp. 145-157.

(Continued)

*Primary Examiner* — Sath V Perungavoor
*Assistant Examiner* — Howard D Brown, Jr.
(74) *Attorney, Agent, or Firm* — Canon USA, Inc. I.P. Division

(57) ABSTRACT

According to the present invention, an imaging condition setting method includes an object discriminating step S1-1 of discriminating the object by using images, a discriminable range generating step S1-2 of generating a discriminable range that is a range of the imaging conditions under which the object is discriminable, an identification determination result range generating step S1-2 of generating an identification determination result range that is a range of the imaging conditions under which the objects are determined as identical, an imaging condition setting rule generating step S1-4 of generating an imaging condition setting rule that is a rule for changing an imaging condition by using the discriminable range and the identification determination result range, and an imaging condition setting step S2-4 of setting an imaging condition under which the object is discriminable by using the imaging condition setting rule generated by the imaging condition setting rule generating step.

10 Claims, 8 Drawing Sheets

(51) Int. Cl.
  *G06K 9/00* (2006.01)
  *G06K 9/36* (2006.01)

(56) References Cited

U.S. PATENT DOCUMENTS

| | | | | |
|---|---|---|---|---|
| 2010/0158310 | A1* | 6/2010 | McQueen | G06K 9/00 382/100 |
| 2011/0103652 | A1* | 5/2011 | Saruta | G06K 9/4671 382/106 |
| 2013/0307976 | A1* | 11/2013 | Kiura | H04N 5/232 348/143 |
| 2015/0285624 | A1* | 10/2015 | Kim | H04N 1/00 348/140 |

OTHER PUBLICATIONS

Abrams S et al : "Computing Camera Viewpoints in a Robot Work-Cell" Apr. 22, 1996 pp. 1972-1979.

Tarabanis K et al : "Analytical Characterization of the Feature Detectability Constraints of Resolution, Focus, and Field-of-View for Vision Sensor Planning" May 1, 1994 pp. 340-358.

* cited by examiner

IMAGING APPARATUS AND IMAGING CONDITION SETTING METHOD AND PROGRAM

TECHNICAL FIELD

The present invention relates to imaging apparatuses and imaging condition setting methods and programs.

In particular, the present invention relates to an imaging apparatus which discriminates the position, posture, or type, for example, of an object by using image data captured by imaging of the object and an imaging condition setting method and program which are preferable for imaging an object with the imaging apparatus.

BACKGROUND ART

In recent years, the demands for causing robots to perform works have grown, such as assembly works in factories. A robot handling an object without a fixed position, posture or type, for example, may require a device for measuring the position, posture or type, for example, of the object. A visual sensor may be widely used as the device for measuring the position, posture or type, for example, of the object.

Causing a robot to perform a work such as an advanced assembly work may require discrimination of an object with a visual sensor, for example. Hitherto, studies have been carried out on identification of the type and position/posture of a part by comparing form information such as CAD data of an object and two-dimensional or three-dimensional information acquired with a visual sensor, for example. Alternatively, an identification method has been studied actively which identifies the type of an object appearing on an input image by causing a computer to learn a feature value extracted from an image of an object acquired with an image-pickup unit.

Generally, identification based on passive vision has been used for discriminating an object. The identification based on passive vision may identify an object by using an input image acquired with a fixed camera. This configuration is difficult to discriminate objects having similar appearances. When it is difficult to acquire sufficient information from a single image, the camera may be actively controlled so as to image an object from a plurality of viewpoints to acquire information. One method in the past selects a behavior such that the mutual entropy between an input image and an image acquired after the behavior may be the highest (NPL 1). This may be available as an example of the method which actively controls a camera so as to image an object from a plurality of viewpoints and acquire information.

According to the method described in NPL 1, mutual entropies for all imaging conditions are acquired by simulating the results online. This may increase the amount of calculations and take a long time for the calculation for setting a new imaging condition. The high number of possible patterns of internal states during the calculation makes advance calculation and caching difficult. Thus, the method described in NPL 1 is difficult to quickly set an imaging condition.

CITATION LIST

Non Patent Literature

NPL 1: Joachim Denzler, Christopher M. Brown "information Theoretic Sensor Data Selection for Active Object Recognition and State Estimation", IEEE Transactions on Pattern Analysis and Machine Intelligence, Vol. 24, Issue 2 (February, 2002), pp. 145-157.

SUMMARY OF INVENTION

In view of the circumstances, the present invention provides an imaging condition setting method which may quickly set an imaging condition. Particularly, the present invention provides an imaging apparatus which allows quick setting of an imaging condition under which a correct discrimination result may be acquired (in other words, the imaging condition may be changed quickly) even when a wrong discrimination result has been acquired and an imaging condition setting method and program that are applicable to the imaging apparatus.

According to the present invention, the foregoing object is attained by providing an imaging apparatus allowing setting of an imaging condition for an image to be used for discriminating an object, the apparatus including an image pickup unit which images the object, an object discriminating unit which discriminates the object by using a plurality of images captured under a plurality of imaging conditions by the image pickup unit, a discriminable range generating unit which generates a discriminable range that is a range of the plurality of imaging conditions under which the object is discriminable by the object discriminating unit, an identification determination result range generating unit which generates an identification determination result range that is a range of the plurality of imaging conditions under which the discriminable range generating unit determines the objects are identical, an imaging condition setting rule generating unit which generates an imaging condition setting rule that is a rule for setting an imaging condition by using the discriminable range and the identification determination result range, and an imaging condition setting unit which sets an imaging condition by using the imaging condition setting rule.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Preferred embodiments of the present invention will be described in detail in accordance with the accompanying drawings.

First Embodiment

Figure 1:
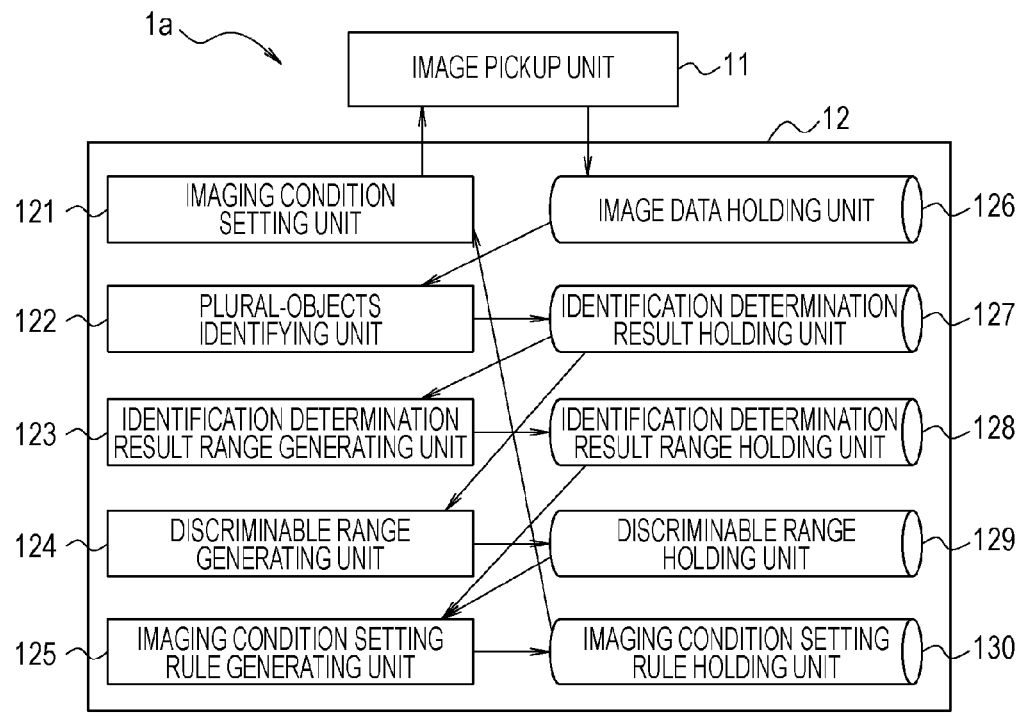
FIG. 1 is a block diagram illustrating an entire configuration of an imaging apparatus of a first embodiment of the present invention.

A first embodiment of the present invention will be described in detail with reference to drawings. The first embodiment of the present invention may discriminate objects which may have similar appearances from a plurality of directions that are mutually different. FIG. 1 is a block diagram illustrating an entire configuration of an imaging apparatus of a first embodiment of the present invention or an image pickup system 1a of the first embodiment (hereinafter called a "first imaging apparatus" 1a).

As illustrated in FIG. 1, the first imaging apparatus 1a includes an image pickup unit 11 which may image an object and generate image data and a calculating unit 12 which may perform various types of calculation. The calculating unit 12 has an imaging condition setting unit 121, a plural-objects discriminating unit 122, an identification determination result range generating unit 123, a predetermined generating unit, and a predetermined holding unit. The predetermined generating unit may include an discriminable range generating unit 124 and an imaging condition setting rule generating unit 125. The predetermined holding unit includes an image data holding unit 126, an discrimination result holding unit 127, an discriminable range holding unit 129, an identification determination result range holding unit 128, and an imaging condition setting rule holding unit 130. The units 121 to 130 included in the calculating unit 12 may be embodied as a computer (hardware) and a program (software) that operates on the computer.

The units 121 to 130 included in the calculating unit 12 may be summarized as follows: The imaging condition setting unit 121 sets various imaging conditions for the image pickup unit 11. The plural-objects discriminating unit 122 discriminates the positions, postures or types, for example, of a plurality of objects corresponding to a plurality of kinds of position, posture or type, for example, learned in advance. The identification determination result range generating unit 123 generates the range of an imaging condition in which the plural-objects discriminating unit 122 determines that the positions, postures or types, for example, of an object are identical. The range of an imaging condition is an identical imaging condition range of an imaging condition of the image pickup unit 11. The discriminable range generating unit 124 generates an imaging condition range for the image pickup unit 11 in which the plural-objects discriminating unit 122 may discriminate the position, posture or type, for example, of an object. The imaging condition setting rule generating unit 125 generates an imaging condition setting rule to be used for changing an imaging condition to be set to the image pickup unit 11 by the imaging condition setting unit 121. The image data holding unit 126 holds image data generated by the image pickup unit 11. The discrimination result holding unit 127 holds an discrimination result by the plural-objects discriminating unit 122. The discriminable range holding unit 129 holds an discriminable range generated by the discriminable range generating unit 124. The identification determination result range holding unit 128 holds an identification determination result range generated by the identification determination result range generating unit 123. The imaging condition setting rule holding unit 130 holds an imaging condition setting rule generated by the imaging condition setting rule generating unit 125.

Figure 2:
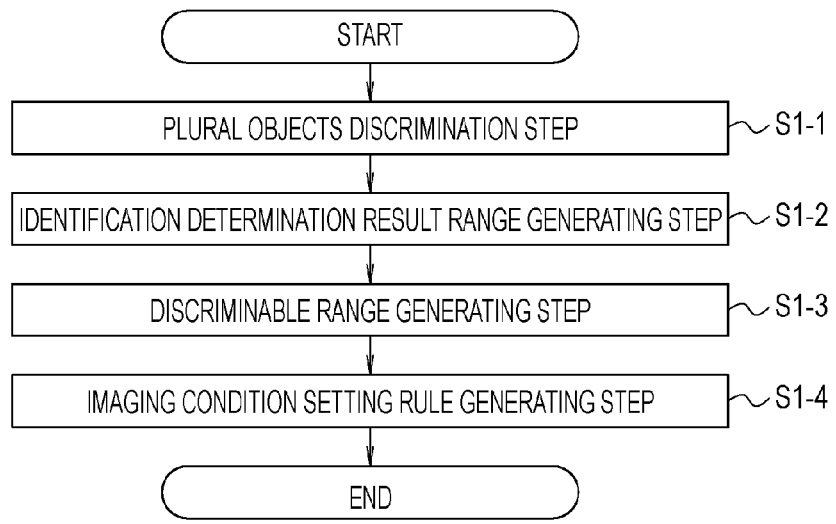
FIG. 2 is a flowchart illustrating a processing flow according to an imaging condition setting method and program of the first embodiment of the present invention.

A processing flow according to an imaging condition setting method and program of the first embodiment of the present invention will be described with reference to FIG. 2. The processing flow according to an imaging condition setting method and program of the first embodiment of the present invention is applied to the first imaging apparatus 1a. FIG. 2 is a flowchart illustrating a processing flow according to an imaging condition setting method and program of the first embodiment of the present invention. As illustrated in FIG. 2, an imaging condition setting method and program of the first embodiment of the present invention includes a plural-objects discrimination step S1-1, an identification determination result range generation step S1-2, an discriminable range generation step S1-3, and an imaging condition setting rule generation step S1-4.

In the plural-objects discrimination step S1-1, the plural-objects discriminating unit 122 transmits a predetermined instruction to the imaging condition setting unit 121. The imaging condition setting unit 121 transmits a control signal to the image pickup unit 11. The image pickup unit 11 uses the control signal from the imaging condition setting unit 121 to image each of a plurality of objects and generates image data. The image data pieces generated by the image pickup unit 11 are transmitted to and held in the image data holding unit 126.

The plural-objects discriminating unit 122 uses the image data pieces held in the image data holding unit 126 to discriminate the position, posture or type, for example, of each of the plurality of objects. The method for discriminating the position, posture or type, for example, of each of a plurality of objects is not particularly limited, but the following method may be applicable. First, the image pickup unit 11 may image an object from each vertex of a geodesic dome having 162 vertices in advance, and 162 image data pieces are thus generated. The generated 162 image data pieces are held as template image data pieces. The plural-objects discriminating unit 122 performs template matching to acquire the similarity between image data generated by imaging the object by the image pickup unit 11 and the 162 template image data pieces. The plural-objects discriminating unit 122 may use the most similar template image data piece to discriminate the position, posture or type, for example, of the object. The method for discriminating the position, posture or type, for example, of an object is not limited to the method, and other methods may be used. Any method may be used which may discriminate the position, posture or type, for example, of an object. The discrimination result is held in the discrimination result holding unit 127.

In identification determination result range generation step S1-2, the identification determination result range generating unit 123 uses the discrimination result held in discrimination result holding unit 127 to generate an identification determination result range. The identification determination result range is a range of an imaging condition of the image pickup unit 11 in which the identity of the position or posture, for example, of an object is determined. The identification determination result range generated by the identification determination result range generating unit 123 is held in the identification determination result range holding unit 128.

In the discriminable range generation step S1-3, the discriminable range generating unit 124 uses the discrimination result held in the discrimination result holding unit 127 to generate an discriminable range. The discriminable range is a range of an imaging condition of the image pickup unit 11 in which the position, posture or type, for example, of an object is discriminable. The discriminable range generated by the discriminable range generating unit 124 is held in the discriminable range holding unit 129.

In the imaging condition setting rule generation step S1-4, the imaging condition setting rule generating unit 125 generates an imaging condition setting rule. The imaging condition setting rule is generated by using an identification determination result range held in the identification determination result range holding unit 128 and an discriminable range held in the discriminable range holding unit 129. The imaging condition setting rule is a rule for changing the imaging condition to be set to the image pickup unit 11 by the imaging condition setting unit 121. The imaging condition setting rule generated by the imaging condition setting rule generating unit 125 is held in the imaging condition setting rule holding unit 130.

Figure 3:
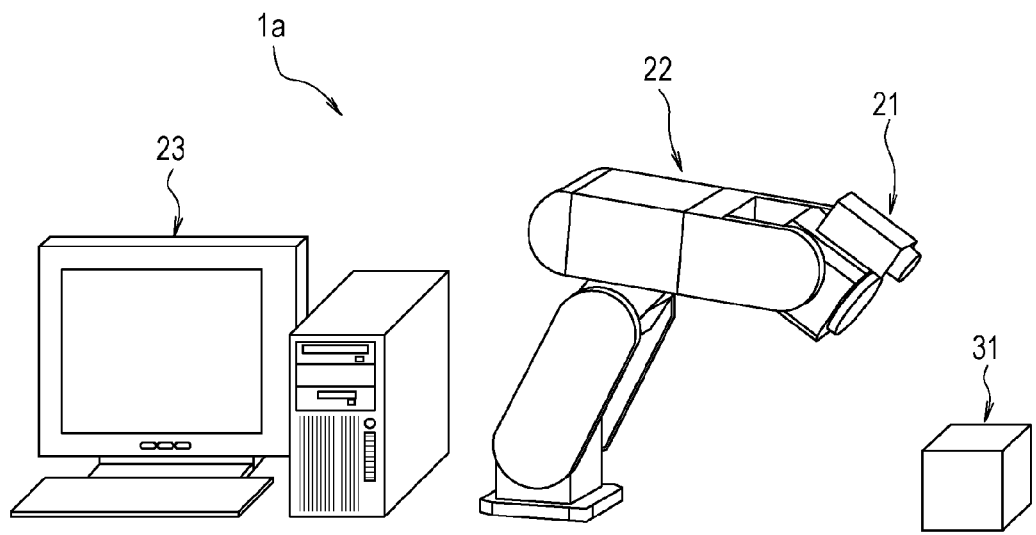
FIG. 3 schematically illustrates a specific configuration of an imaging apparatus of a first embodiment of the present invention.

Next, a specific configuration of the first imaging apparatus 1a will be described. FIG. 3 schematically illustrates a specific configuration of the first imaging apparatus 1a.

As illustrated in FIG. 3, the first imaging apparatus 1a includes a camera 22, a robot arm 22, and a calculator (computer) 23. The camera 22 corresponds to the image pickup unit 11. The robot arm 22 allows arbitrary setting of the viewpoint position and/or posture of the camera 22. The calculator 23 corresponds to the calculating unit 12.

The camera 22 corresponding to the image pickup unit 11 may image an object 31 under various imaging conditions and thus generate image data pieces. The imaging conditions may include, for example, one or a combination of the viewpoint position of the camera 22, the posture of the camera 22, the position of an illumination which radiates light to an object, the posture of the illumination, the resolution of an image to be generated, and the field angle of the camera 22. The viewpoint position and/or posture of the camera 22 may be arbitrarily set in accordance with the robot arm. The camera 22 as the image pickup unit 11 is connected to the calculator 23 as the calculating unit 12.

The calculator (computer) 23 corresponding to the calculating unit 12 has functions by software (program) of the plural-objects discriminating unit 122, identification determination result range generating unit 123, discriminable range generating unit 124, and imaging condition setting rule generating unit 125. The calculator 23 further includes an interface. The interface corresponds to the imaging condition setting unit 121 and allows control over the camera 22. The calculator 23 includes memory, and a non-volatile storage device may be externally connected thereto or may be internally provided therein. The memory is usable as the image data holding unit 126, discrimination result holding unit 127, identification determination result range holding unit 128, and/or discriminable range holding unit 129. The non-volatile storage device may be usable as the imaging condition setting rule holding unit 130.

Next, with reference to FIG. 2, specific processing steps of the imaging condition setting method and program of the first embodiment of the present invention will be described.

In the plural-objects discrimination step S1-1, the camera 22 images the object 31 from various viewpoints and thus generates a plurality of image data pieces. For imaging the object 31 from various viewpoints, any of the following methods of (1) to (4) may be applicable: (1) A method in which the object 31 is imaged by moving the camera 22 that is the image pickup unit 11; (2) A method in which the object 31 is imaged with the camera 22 arranged with predetermined postures at many positions; (3) A method in which the object 31 itself is rotated to image; and (4) A combination method of (1) to (3) above. In other words, any method is applicable if the object 31 may be imaged by changing the relative positions and/or directions of the camera 22 and the object 31. According to the first embodiment of the present invention, the robot arm 22 is controlled such that the object 31 may be imaged with a camera from vertices of a geodesic dome having 642 vertices, and 642 image data pieces are generated. The plural-objects discriminating unit 122 uses the generated image data pieces to discriminate the position, posture or type, for example, of the object. The discrimination results are held in the discrimination result holding unit 127.

In the identification determination result range generation step S1-2, the identification determination result range generating unit 123 uses the discrimination results held in the discrimination result holding unit 127 to generate an identification determination result range. The identification determination result range is a range in which the identity of the position or posture, for example, of the object 31 is determined. In this step, not only camera viewpoints with mutually close positions and postures but also viewpoints leading wrong discrimination of the position, posture or type, for example, of the object 31 are included in the identification determination result range if they produce an equal discrimination result of the position, posture or type, for example, of the object.

Figure 4:
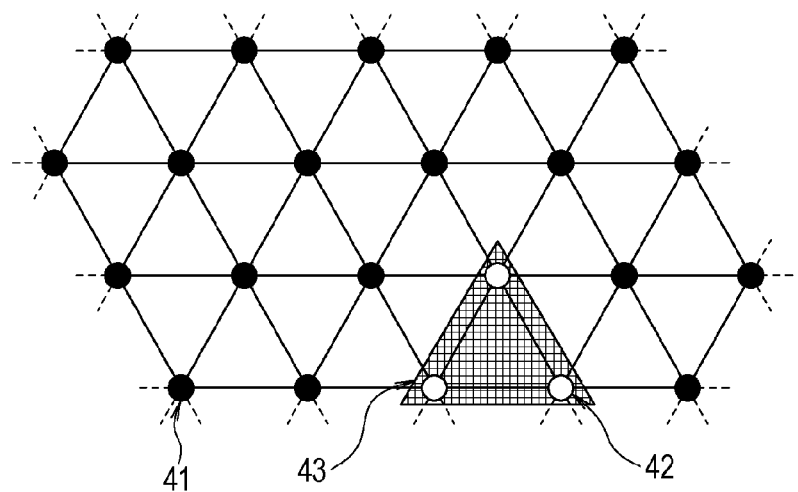
FIG. 4 schematically illustrates one discrimination result A.

FIG. 4 schematically illustrates one discrimination result A. In FIG. 4, vertices of a geodesic dome having 642 vertices are vertices of triangles. Vertices 42 represented by white circles in FIG. 4 indicate positions where image data pieces are generated which produce an equal discrimination result to the discrimination result A (=a position where the image is captured). Vertices 41 represented by black circles in FIG. 4 indicate positions where image data pieces are generated which produces a different discrimination result from the discrimination result A. The area 43 surrounding the vertices 42 represented by the white circle (shaded area in FIG. 4) indicates the range of an imaging condition where an discrimination results are discriminated as equal to the one discrimination result A. In other words, the range is the identification determination result range 43 for the one discrimination result A. The identification determination result range 43 is held in the identification determination result range holding unit 128.

Figure 5:
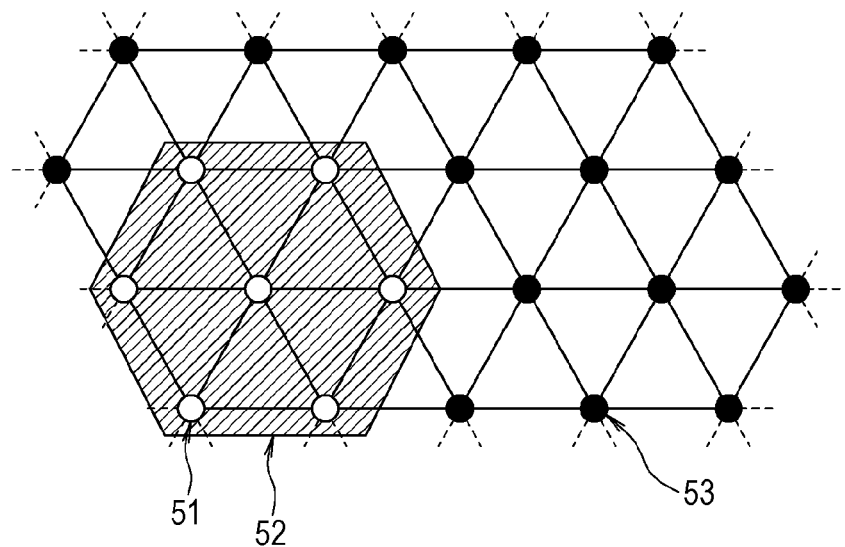
FIG. 5 schematically illustrates a discriminable range generation step.

In the discriminable range generation step S1-3, the discriminable range generating unit 124 generates an discriminable range. The discriminable range refers to a range of an imaging condition where the positions, postures or types, for example, of an object is discriminable. The discriminable range is generated by using discrimination results held in the discrimination result holding unit 127. According to the first embodiment of the present invention, 642 image data pieces generated by imaging the object 31 from vertices of a geodesic dome having 642 vertices are used to determine the discriminable range. FIG. 5 schematically illustrates the discriminable range generation step S1-3. In FIG. 5, the vertices of a geodesic dome having 642 vertices are vertices of triangles. Vertices 51 represented by white circles in FIG. 5 indicate positions where image data pieces are generated which succeed in the discrimination of the position, posture or type, for example, of an object. On the other hand, vertices 53 represented by black circles indicate positions where image data pieces are generated which fail the discrimination of the position, posture or type, for example, of an object. The area surrounded by vertices with succeeded discrimination is an discriminable range 52. In FIG. 5, the hatched area 52 is the discriminable range 52. The generated discriminable range 52 is held in the discriminable range holding unit 129.

Figure 6:
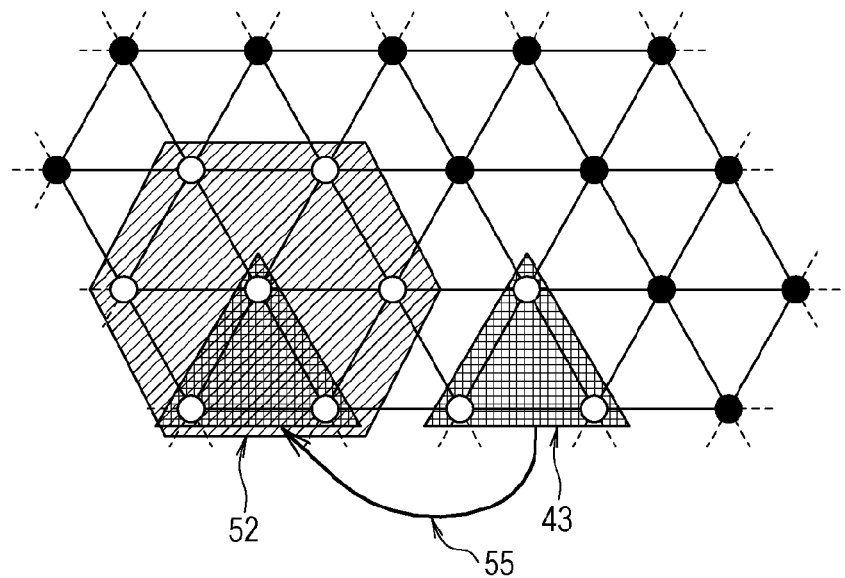
FIG. 6 schematically illustrates a step of generating an imaging condition setting rule.

In the imaging condition setting rule generation step S1-4, the imaging condition setting rule generating unit 125 generates an imaging condition setting rule. The imaging condition setting rule is generated by using an identification determination result range held in the identification determination result range holding unit 128 and an discriminable range held in the discriminable range holding unit 129. An imaging condition setting rule is represented by a direction and a distance. FIG. 6 schematically illustrates the step of generating an imaging condition setting rule. In the example in FIG. 6, vertices of a geodesic dome having 642 vertices are vertex of triangles with regard to the one discrimination result A. In the imaging condition setting rule generation step S1-4, a distance and direction of movement of the identification determination result range are searched which satisfy a predetermined condition (which will be called a first condition). The first condition may be a condition that one identification determination result range 43 and the discriminable range 52 overlap with each other at a maximum, for example. As indicated by the arrow 55 in FIG. 6, when the identification determination result range 43 is moved to the left by a distance for two vertices, the identification determination result range 43 overlaps with the discriminable range 52 completely. An imaging condition setting rule is the distance and direction of movement of the identification determination result range 43 that satisfy the first condition. When two or more distances and directions of movement satisfy the first condition, an imaging condition setting rule is searched which satisfies another predetermined condition (which will be called a second condition). The second condition may be a condition that the amount of change in imaging condition is the smallest, for example. The generated imaging condition setting rule is held in the imaging condition setting rule holding unit 130.

Resetting (or changing) an imaging condition in accordance with the generated imaging condition setting rule allows setting of an imaging condition which provides a correct discrimination result even when a wrong discrimination result is acquired. The use of different imaging conditions may provide correct discrimination results, which may provide an discrimination result with high accuracy and reliability. An imaging condition setting rule held in the imaging condition setting rule holding unit 130 is data with an discrimination result as an index and may thus be referred quickly. This allows discrimination of an object by quickly resetting (=changing) an imaging condition.

Figure 7:
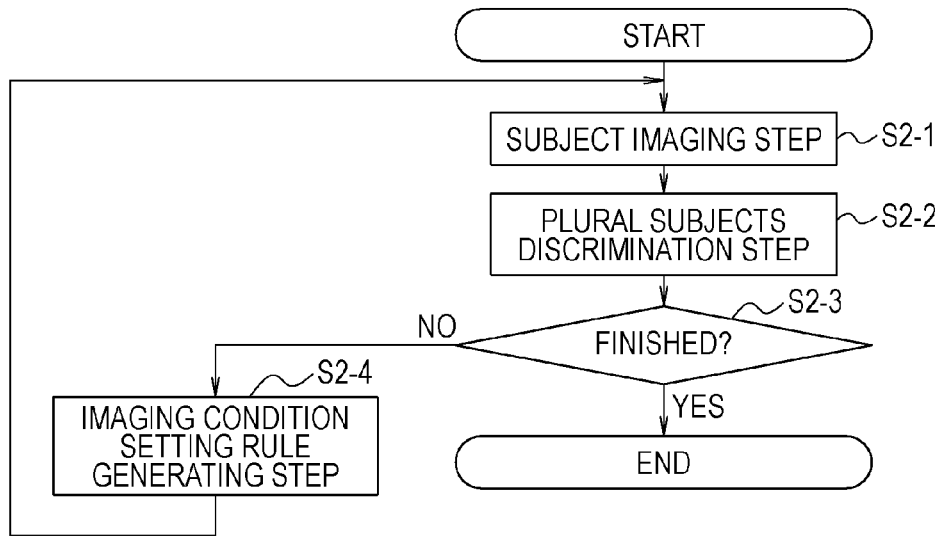
FIG. 7 is a flowchart illustrating a processing flow of an object discrimination method.
Figure 8:
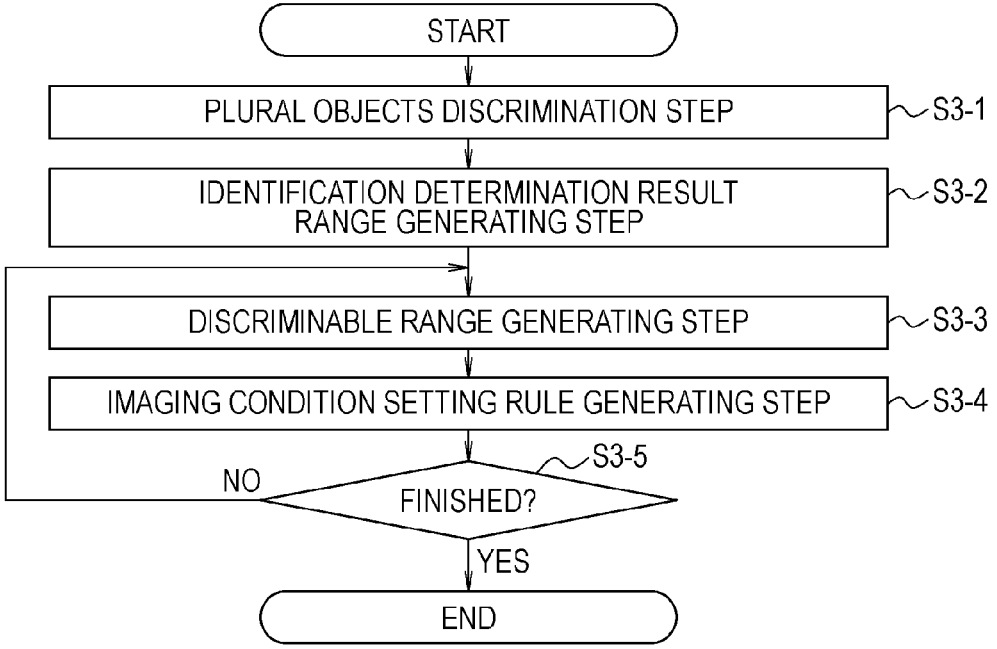
FIG. 8 is a flowchart illustrating a processing flow of an imaging condition setting method and program of a second embodiment of the present invention.
Figure 9:
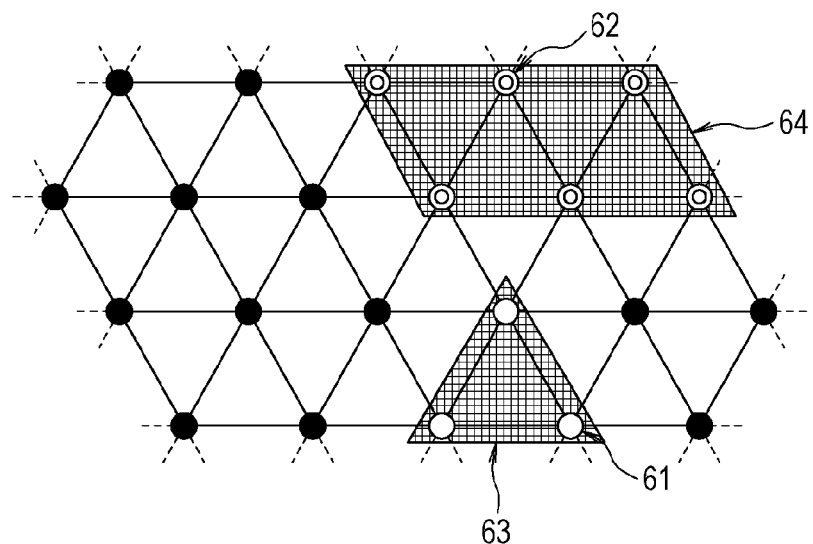
FIG. 9 illustrates two identification determination result ranges that are mutually different.
Figure 10:
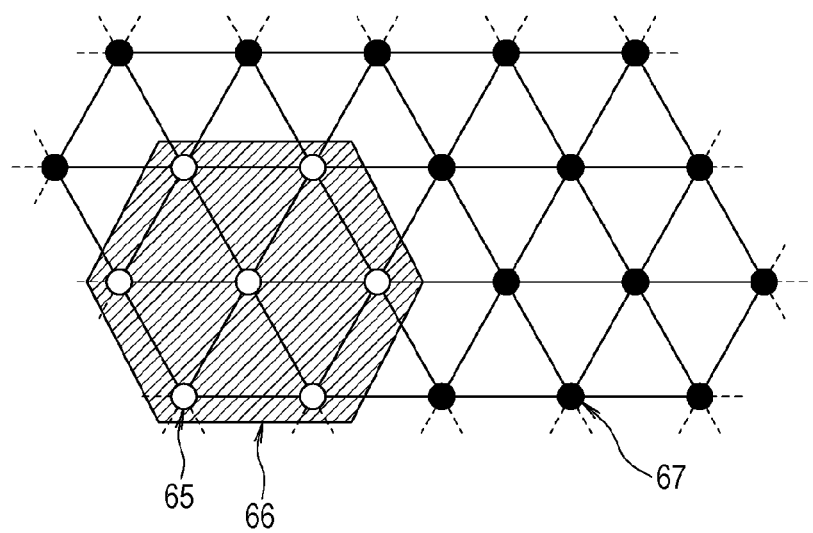
FIG. 10 illustrates a discriminable range.
Figure 11:
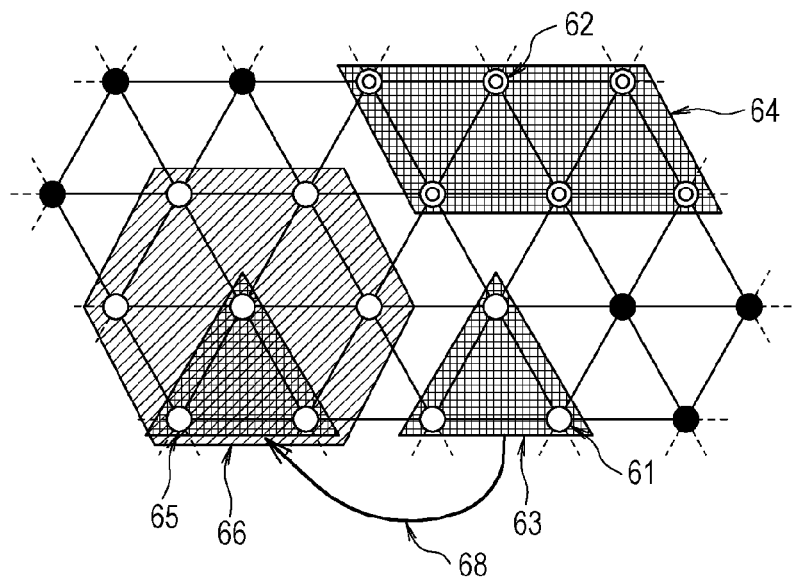
FIG. 11 schematically illustrates an imaging condition setting rule generation step.

Next, a method for discriminating the position, posture or type, for example, of an object will be described which uses an imaging condition setting rule held in the imaging condition setting rule holding unit 130. FIG. 7 is a flowchart illustrating a processing flow of an object discrimination method. The processing flow of the object discrimination method includes an object imaging step S2-1, a plural-objects discrimination step S2-2, an end determination S2-3, and an imaging condition setting step S2-4.

In the object imaging step S2-1, the image pickup unit 11 images the object 31 and generates image data. In the plural-objects discrimination step S2-2, the plural-objects discriminating unit 122 uses the generated image data to discriminate the position, posture or type, for example, of the object 31. In the end determination S2-3, the discrimination result is used to determine whether the discrimination of the position, posture or type, for example, of the object 31 is to be finished or not. "Yes" in FIG. 7 is a case where the end determination results in the end of the discrimination. "No" is a case where the end of the discrimination is not determined.

Various conditions are applicable for determining the end of discrimination in the end determination S2-3. According to the first embodiment of the present invention, the end determination S2-3 results in the end of the discrimination if the following two conditions of (1) and (2) are both satisfied. (1) The imaging condition has been changed at least once. (2) The position, posture or type, for example, of an object is equal between the discrimination result under the initial imaging condition by the plural-objects discriminating unit 122 and the discrimination result after the imaging condition is changed.

If the end determination S2-3 does not result in the end of discrimination, a new imaging condition is set (=the imaging condition is changed) in accordance with the imaging condition setting rule held in the imaging condition setting rule holding unit 130. More specifically, the image pickup unit 11 is moved in accordance with the imaging condition setting rule. The newly set imaging condition is applied, and the object imaging step S2-1 and plural-objects discrimination step S2-2 are performed again. This processing is repeated until the end of discrimination is determined in the end determination S2-3.

Second Embodiment

Next, a second embodiment of the present invention will be described. A second embodiment of the present invention discriminates mutually different objects having similar appearances. Differences from the first embodiment of the present invention will be described mainly, and the description of some common matters to the first embodiment of the present invention will be omitted. The same configuration as that of the first imaging apparatus is applicable (see FIG. 1) to an imaging apparatus of the second embodiment of the present invention or an image pickup system (hereinafter called a "second imaging apparatus") according to the second embodiment. A specific configuration of the second imaging apparatus may also be the same as that of the first imaging apparatus (see FIG. 3).

As illustrated in FIG. 3, the first imaging apparatus 1a includes a camera 21, a robot arm 22, and a calculator (computer) 23. The camera 21 corresponds to the image pickup unit 11. The robot arm 22 allows arbitrary setting of the viewpoint position and/or posture of the camera 21. The calculator 23 corresponds to the calculating unit 12.

The camera 21 corresponding to the image pickup unit 11 may image an object 31 under various imaging conditions and thus generate image data pieces. The imaging conditions may include, for example, one or a combination of the viewpoint position of the camera 21, the posture of the camera 21, the position of an illumination which radiates light to an object, the posture of the illumination, the resolution of an image to be generated, and the field angle of the camera 21. The viewpoint position and/or posture of the camera 21 may be arbitrarily set in accordance with the robot arm. The camera 21 as the image pickup unit 11 is connected to the calculator 23 as the calculating unit 12.

The calculator (computer) 23 corresponding to the calculating unit 12 has functions by software (program) of the plural-objects discriminating unit 122, identification determination result range generating unit 123, discriminable range generating unit 124, and imaging condition setting rule generating unit 125. The calculator 23 further includes an interface. The interface corresponds to the imaging condition setting unit 121 and allows control over the camera 21. The calculator 23 includes memory, and a non-volatile storage device may be externally connected thereto or may be internally provided therein. The memory is usable as the image data holding unit 126, discrimination result holding unit 127, identification determination result range holding unit 128, and/or discriminable range holding unit 129. The non-volatile storage device may be usable as the imaging condition setting rule holding unit 130.

In the imaging condition setting rule generation step S3-4, an imaging condition setting rule that satisfies a predetermined condition (which will be called a third condition) is searched in each of the one identification determination result range 63 and the other identification determination result range 64. The imaging condition setting rule is represented by a direction and a distance. The third condition may be a condition that one identification determination result range overlaps with a discriminable range completely, for example. When a plurality of imaging condition setting rules that satisfy the third condition are found, an imaging condition setting rule that satisfies another predetermined condition (which will be called a fourth condition) is selected. The fourth condition may be, for example, a condition that the overlap with the original discriminable range is at a maximum or a condition that the amount of change in imaging condition is at a minimum.

In the plural-objects discrimination step S1-1, the camera 21 images the object 31 from various viewpoints and thus generates a plurality of image data pieces. For imaging the object 31 from various viewpoints, any of the following methods of (1) to (4) may be applicable: (1) A method in which the object 31 is imaged by moving the camera 21 that is the image pickup unit 11; (2) A method in which the object 31 is imaged with the camera 21 arranged with predetermined postures at many positions; (3) A method in which the object 31 itself is rotated to image; and (4) A combination method of (1) to (3) above. In other words, any method is applicable if the object 31 may be imaged by changing the relative positions and/or directions of the camera 21 and the object 31. According to the first embodiment of the present invention, the robot arm 22 is controlled such that the object 31 may be imaged with a camera from vertices of a geodesic dome having 642 vertices, and 642 image data pieces are generated. The plural-objects discriminating unit 122 uses the generated image data pieces to discriminate the position, posture or type, for example, of the object. The discrimination results are held in the discrimination result holding unit 127.

Figure 12:
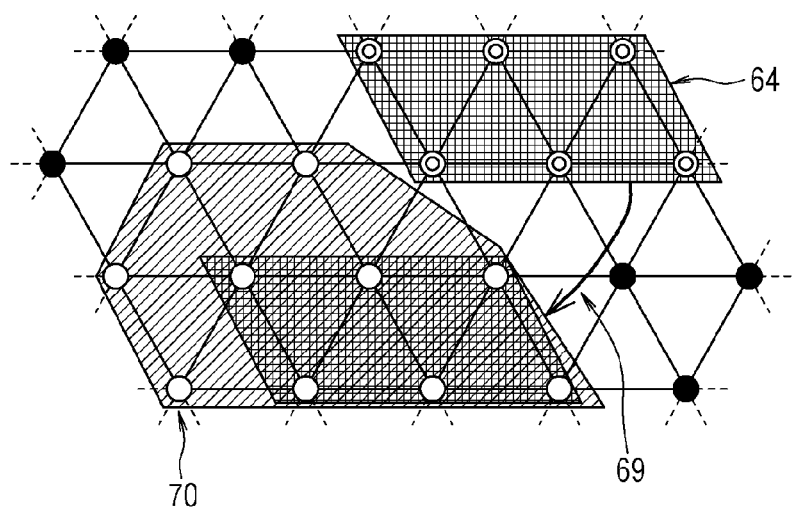
FIG. 12 illustrates second and subsequent discriminable range generation steps.

If the end determination S3-5 determines not to finish, the discriminable range generation step S3-3 is performed again. FIG. 12 illustrates the second and subsequent discriminable range generation steps S3-3. As illustrated in FIG. 12, the second and subsequent discriminable range generation steps S3-3 generate new discriminable ranges 70. More specifically, a new discriminable range 70 is generated by adding the identification determination result range 63 for which an imaging condition setting rule is generated to the already generated discriminable range 70. In other words, the discriminable range 66 is extended.

The second and subsequent imaging condition setting rule generation steps S3-4 generate a new imaging condition setting rule. More specifically, in the identification determination result range for which an imaging condition setting rule has not been generated (hereinafter called an ungenerated identification determination result range), a new imaging condition setting rule that satisfies a predetermined condition (which will be called fifth condition). The fifth condition may be one that an ungenerated identification determination result range completely overlaps with a new discriminable range, for example. In the example illustrated in FIG. 12, when the other identification determination result range 64 that is an ungenerated identification determination result range is moved on a left diagonal as indicated by the arrow 69 by a distance for two vertices, the other identification determination result range 64 completely overlaps with the new discriminable range 70. In this way, the direction and distance of movement of the ungenerated identification determination result range that satisfies the fifth condition are a new imaging condition setting rule.

However, if no imaging condition setting exists with which ungenerated identification determination result range completely overlaps with the discriminable range, a new imaging condition setting rule that satisfies another predetermined condition (which will be called a sixth condition) is searched. The sixth condition may be one that the ungenerated identification determination result range and the discriminable range overlap at a maximum. If a plurality of new imaging condition setting rules that satisfy the sixth condition are found, a new imaging condition setting rule that satisfies another predetermined condition (which will be called a seventh condition) is searched. The seventh condition may be one that the overlap with the original discriminable range is at a maximum or that the amount of change in imaging condition is at a minimum, for example. By repeating this processing recursively, a new imaging condition setting rule is generated. The generated new imaging condition setting rule is held in the imaging condition setting rule holding unit 130.

The thus generated new imaging condition setting rule is used to reset the imaging condition (or change the imaging condition) a plurality of number of times. This configuration allows setting of an imaging condition which may produce a correct discrimination result even when the discrimination of the position, posture or type, for example, of an object is difficult with one change of the imaging condition.

Next, with reference to FIG. 7, there will be described a method for discriminating the position, posture, or type, for example, of an object by using an imaging condition setting rule held in the imaging condition setting rule holding unit 130. In the object imaging step S2-1, an object is imaged, and image data is thus generated. In the plural-objects discrimination step S2-2, the plural-objects discriminating unit 122 uses the generated image data to discriminate the position, posture or type, for example, of the object. In the end determination S2-3, whether the discrimination is to be finished or not is determined by using the discrimination result. Various conditions for the determination to finish may be applicable. According to the second embodiment of the present invention, the discrimination end condition is the satisfaction of both of the following (1) and (2): (1) The imaging condition has been changed at least once; and (2) The position, posture or type, for example, of an object is equal between the discrimination result under the initial imaging condition by the plural-objects discriminating unit 122 and the discrimination result after the imaging condition is changed. If the end determination does not result in the end of discrimination, the processing moves to the imaging condition setting step S2-4. In the imaging condition setting step S2-4, the imaging condition is changed in accordance with the imaging condition setting rule held in the imaging condition setting rule holding unit 130. By using the changed imaging condition, the object imaging step S2-1 and plural-objects discrimination step S2-2 are performed again. This processing is repeated until the end of discrimination is determined in the end determination S2-3.

Third Embodiment

Next, a third embodiment of the present invention will be described. The third embodiment of the present invention uses an illumination which radiates light to an object. The entire configuration of an imaging apparatus of the third embodiment of the present invention or an image pickup system 1c of the third embodiment of the present invention (hereinafter called a "third imaging apparatus" 1c) may apply the same configuration as that of the first imaging apparatus 1a (see FIG. 1). The processing flow for generating an imaging condition setting rule according to the third embodiment of the present invention may apply the processing flow illustrated in FIG. 2. However, the specific configuration of the third imaging apparatus 1c and the specific steps of the processing flow for generating an imaging condition setting rule according to the third embodiment of the present invention are different from the first embodiment. Differences from the first embodiment of the present invention will be described mainly, and the description of some common matters to the first embodiment of the present invention will be omitted.

Figure 13:
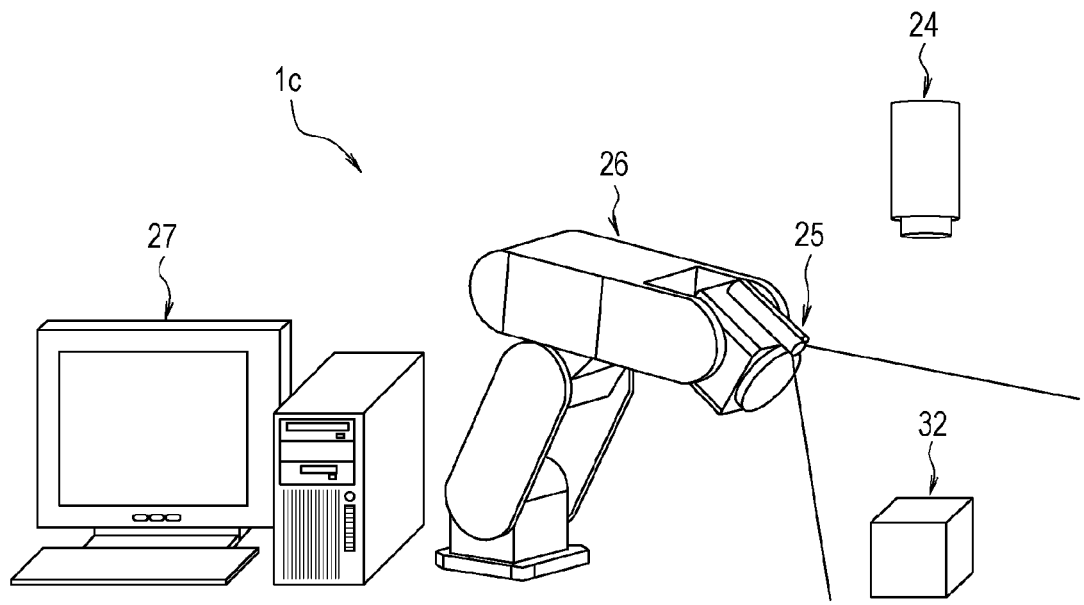
FIG. 13 illustrates a specific configuration of a third imaging apparatus.

FIG. 13 illustrates a specific configuration of the third imaging apparatus 1c. The third imaging apparatus includes a calculator (computer) 27, a camera 24, an illumination 25, and a robot arm 26. The calculator 27 corresponds to the calculating unit 12. The camera 24 and illumination 25 correspond to the image pickup unit 11. The illumination 25 corresponding to the image pickup unit 11 is provided in the robot arm 26. The robot arm 26 may arbitrarily set the position and/or posture of the illumination 25. The illumination 25 may illuminate an object 32 with an arbitrary viewpoint position and posture by controlling the robot arm 26.

The camera 24 as the image pickup unit 11 images the object 32 to which light is radiated by the illumination 25 as the image pickup unit 11 and thus generates image data. The illumination 25 and camera 24 as the image pickup unit 11 may image an object under various imaging conditions. The imaging conditions may include, for example, one or a combination of the position, posture and/or field angle of the image pickup unit that captures an image of the object 32, the resolution of an image captured by the image pickup unit, and the position, posture, and/or luminance of the illumination 25 which radiates light to the object 32. The illumination 25 and camera 24 are connected to the calculator 27.

The calculator (computer) 27 corresponds to the calculating unit 12. The calculator 27 has functions by software (program) of a plural-objects discriminating unit 122, an identification determination result range generating unit 123, a discriminable range generating unit 124, an imaging condition setting rule generating unit 125. The calculator 27 further includes an interface corresponding to the imaging condition setting unit 121. The interface allows control over the camera 24 and illumination 25.

The calculator 27 includes memory, and a non-volatile storage device may be externally connected thereto or may be internally provided therein. The memory is usable as the image data holding unit 126, discrimination result holding unit 127, identification determination result range holding unit 128, and/or discriminable range holding unit 129. The non-volatile storage device may be usable as the imaging condition setting rule holding unit 130.

Next, with reference to FIG. 2, specific processing steps of an imaging condition setting method and program of the third embodiment of the present invention will be described. An imaging condition setting method and program of the first embodiment of the present invention includes a plural-objects discrimination step S1-1, an identification determination result range generation step S1-2, an discriminable range generation step S1-3, and an imaging condition setting rule generation step S1-4. The specific processing details in steps are different from the first embodiment of the present invention.

In the plural-objects discrimination step S1-1, the illumination 25 radiates light to the object 32 from various viewpoints, and the camera 24 images the object 32 and thus generates image data. The method for radiating light to the object 32 from various viewpoints may be any one of the following (1) to (4): (1) A method in which the object 32 is imaged by moving the illumination 25; (2) A method in which the illuminations 25 arranged with predetermined postures at many positions radiate light to the object 32, and the camera 24 images the object 32; (3) A method in which the illumination 25 radiates light by rotating the object 32, and the camera 24 images the object 32; and (4) A combination method of (1) to (3). In other words, generation of a plurality of image data pieces may only be required with different relative positions and directions of the illumination 25 and object 32.

According to the third embodiment of the present invention, the robot arm 26 is controlled such that the object 32 may be irradiated with light from vertices of a geodesic dome having 642 vertices. Under the condition that the object 32 is being irradiated with light from the vertices, the camera 24 images the object 32, and 642 image data pieces are thus generated. The plural-objects discriminating unit 122 uses the generated image data pieces to discriminate the positions, postures or types, for example, of the object 32. The discrimination results of the positions, postures or types, for example, of the object 32 are held in the discrimination result holding unit 127.

Figure 14:
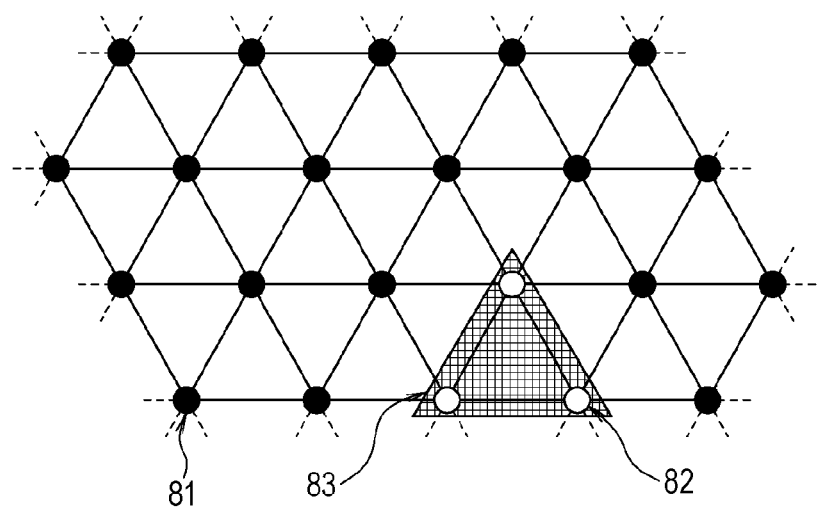
FIG. 14 illustrates one discrimination result A.

In the identification determination result range generation step S1-2, the identification determination result range generating unit 123 uses the discrimination result held in the discrimination result holding unit 127 to generate the identification determination result range. The identification determination result range is an imaging condition range in which the object 32 is determined as having an identical position, posture or type, for example. In this step, not only ranges in which the positions or postures of the illumination 25 are determined as identical because they are close to each other but also illumination conditions under which the position, posture or type, for example, of the object 32 is improperly discriminated are included in the identification determination result range if they produce an equal discrimination result. FIG. 14 illustrates one discrimination result A. In FIG. 14, vertices of a geodesic dome having 642 vertices are vertices of triangles. The illustrated vertex 82 represented by white circles indicate the positions of the illumination 25 with which the position, posture or type, for example, of the object 32 is discriminated as the one discrimination result A. The vertex 81 represented by black circles are positions of the illumination 25 with which the position, posture or types, for example, of the object is discriminated as different from the one discrimination result A. The shaded area 83 is an identification determination result range 83 for the one discrimination result A. In other words, the shaded area 83 is a range in which the position, posture or type, for example, of the object 32 is discriminated as identical to the one discrimination result A. The identification determination result range 83 is held in the identification determination result range holding unit 128.

Figure 15:
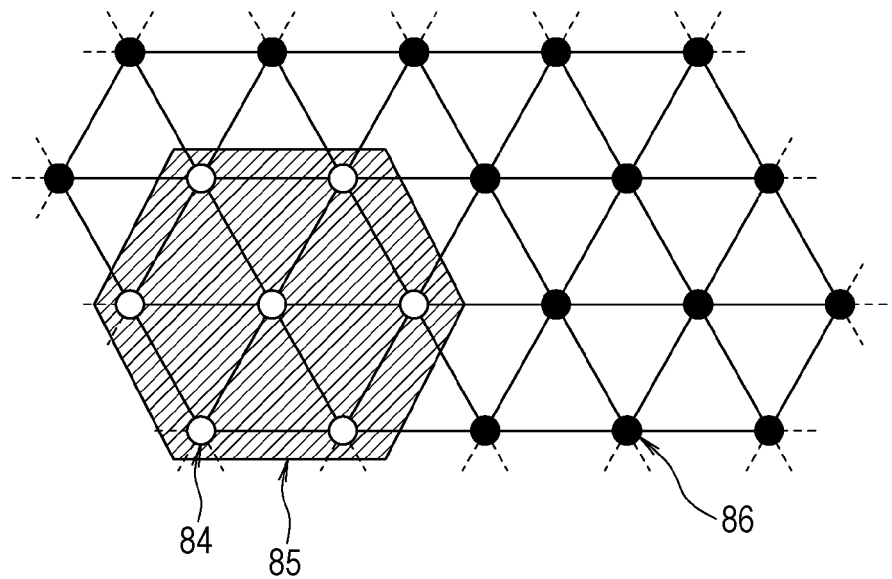
FIG. 15 schematically illustrates the discriminable range generation step.

In the discriminable range generation step S1-3, the discriminable range generating unit 124 generates an imaging condition range in which the position, posture or type, for example, of the object is discriminable. The imaging condition range is a discriminable range. The discriminable range is generated by using discrimination results held in the discrimination result holding unit 127. According to the third embodiment of the present invention, the identification determination result range is generated by the 642 image data pieces. FIG. 15 schematically illustrates the discriminable range generation step S1-3. In FIG. 15, vertices of a geodesic dome having 642 vertices are vertices of triangles. The vertices 84 represented by white circles indicate the positions of the illumination 25 where image data pieces are generated which succeeded in the discrimination of the position, posture or type, for example, of an object. The vertices 86 represented by black circles indicate positions of the illumination 25 where image data pieces are generated which fail the discrimination of the position, posture or type, for example, of an object. The area surrounded by vertices with succeeded discrimination is an discriminable range. The shaded area 85 in FIG. 15 is the discriminable range 85. The generated discriminable range 85 is held in the discriminable range holding unit 129.

Figure 16:
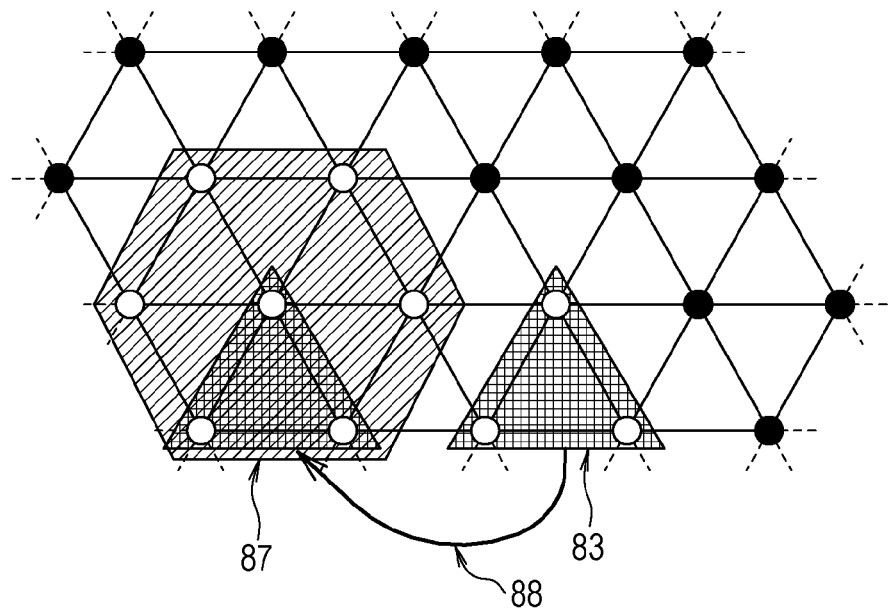
FIG. 16 illustrates a step of generating an imaging condition setting rule for one discrimination result A.

In the imaging condition setting rule generation step S1-4, the imaging condition setting rule generating unit 125 generates an imaging condition setting rule. An imaging condition setting rule is generated by using an identification determination result range held in the identification determination result range holding unit 128 and a discriminable range held in the discriminable range holding unit 129. FIG. 16 illustrates a step of generating an imaging condition setting rule for one discrimination result A. In FIG. 16, vertices of a geodesic dome having 642 vertices are vertices of triangles. In this step, an imaging condition setting rule is searched under which the overlap of one identification determination result range 83 and the discriminable range 85 satisfies a predetermined condition (which will be called an eighth condition). The eighth condition may be a condition under which the overlap of one identification determination result range 83 and the discriminable range 85 is at a maximum, for example. Referring to FIG. 16, as indicated by the arrow 88, when the identification determination result range 83 is moved to the left by a distance for two vertices, the identification determination result range 83 overlaps with the discriminable range 85 completely. An imaging condition setting rule is represented by a distance and a direction which are the distance and direction that the one identification determination result range is moved and satisfy the eighth condition. If two or more ways of movement causing maximum overlaps exist, an imaging condition setting rule which satisfies another predetermined condition (which will be called a ninth condition) is selected. The ninth condition may be one under which the amount of change in imaging condition is at a minimum, for example. The generated imaging condition setting rule is held in the imaging condition setting rule holding unit 130.

The imaging condition setting unit 121 sets an imaging condition under which the position, posture or type, for example, of the object 32 is discriminable. The imaging condition is set by using an imaging condition setting rule held in the imaging condition setting rule holding unit 130. Resetting or changing the imaging condition in accordance with the thus generated imaging condition setting rule may reset an imaging condition that produces a correct discrimination result even when a wrong discrimination result is acquired. The use of different imaging conditions may provide correct discrimination results, which may provide an discrimination result with high accuracy and reliability. An imaging condition setting rule held in the imaging condition setting rule holding unit 130 is data with an discrimination result as an index and may thus be referred quickly. This allows discrimination of the position, posture or type, for example, of an object by quickly resetting or changing the imaging condition.

Next, an object discrimination method using an imaging condition setting rule held in the imaging condition setting rule holding unit 130 will be described with reference to FIG. 7. In the object imaging step S2-1, an object is imaged, and image data is generated. In the plural-objects discrimination step S2-2, the plural-objects discriminating unit 122 uses the generated image data to discriminate the position, posture or type, for example, of the object. In the end determination S2-3, the discrimination result of the position, posture or type, for example, of the object is used to determine whether the discrimination of the position, posture or type, for example, of the object is to be finished or not is determined. "Yes" in FIG. 7 is a case where the end determination results in the end of the discrimination. "No" is a case where the end of the discrimination is not determined. Various conditions are applicable for determining the end of discrimination. According to the third embodiment of the present invention, the condition is to satisfy the following (1) and (2): (1) The imaging condition has been changed at least once; and (2) The position, posture or type, for example, of an object is equal between the discrimination result under the initial imaging condition by the plural-objects discriminating unit 122 and the discrimination result after the imaging condition is changed.

If the end determination S2-3 does not result in the end of discrimination, the processing moves to the imaging condition setting step S2-4. In the imaging condition setting step S2-4, the imaging condition is reset or changed in accordance with an imaging condition setting rule held in the imaging condition setting rule holding unit 130. Then, the object imaging step S2-1 and plural-objects discrimination step S2-2 are performed again. This processing is repeated until the end of discrimination is determined in the end determination S2-3.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-023118, filed Feb. 4, 2011, which is hereby incorporated by reference herein in its entirety.

The invention claimed is:

1. An apparatus comprising:
an image pickup unit configured to image an object;
an object discriminating unit configured to discriminate the object by using a plurality of images captured under a plurality of imaging conditions by the image pickup unit;
a discriminable range generating unit configured to generate a discriminable range that is a range of the plurality of imaging conditions under which the object is discriminable by the object discriminating unit;
an identification determination result range generating unit configured to generate an identification determination result range that is a range of the plurality of imaging conditions under which the discriminable range generating unit determines the objects are identical;
an imaging condition setting rule generating unit configured to generate an imaging condition setting rule that is a rule for setting an imaging condition by using the discriminable range and the identification determination result range; and
an imaging condition setting unit configured to set an imaging condition by using the imaging condition setting rule,
wherein the imaging condition setting rule generating unit generates an imaging condition setting rule that is a rule for setting an imaging condition by using the discriminable range and the identification determination result range and searches for the imaging condition setting rule that the discriminable range and the identification determination result range overlap, and
the imaging condition setting unit sets an imaging condition by using the searched imaging condition setting rule,
wherein the imaging condition setting rule is generated based upon a distance and a direction of movement of the identification determination result range that satisfies a predetermined condition.

2. The apparatus according to claim 1, wherein the identification determination result range generating unit generates a new identification determination result range in which the objects are determined as identical by using the image captured under the imaging condition set by the imaging condition setting unit;
the imaging condition setting rule generating unit generates a new imaging condition setting rule that is a rule for setting the imaging condition by using the new discriminable range and the new identification determination result range and searches for the new imaging condition setting rule under which the new discriminable range and the new identification determination result range overlap; and
the imaging condition setting unit sets the imaging condition by using the searched new imaging condition setting rule.

3. The imaging apparatus according to claim 1, wherein the imaging condition is one or a combination of the position of an image pickup unit which images the object, the posture of the image pickup unit, the field angle of the image pickup unit, the resolution of the image captured by the image pickup unit, the position of an illumination that radiates light to the object, the posture of the illumination.

4. A method comprising:
an object discriminating step of discriminating an object by using a plurality of images captured under a plurality of imaging conditions;
a discriminable range generating step of generating a discriminable range that is a range of the plurality of imaging conditions under which the object is discriminable;
an identification determination result range generating step of generating an identification determination result range that is a range of the plurality of imaging conditions under which the objects are determined as identical;
an imaging condition setting rule generating step of generating an imaging condition setting rule that is a rule for setting an imaging condition by using the discriminable range and the identification determination result range; and
an imaging condition setting step of setting an imaging condition by using the imaging condition setting rule,
wherein the imaging condition setting rule generating step generates an imaging condition setting rule that is a rule for setting an imaging condition by using the discriminable range and the identification determination result range and searches for the imaging condition setting rule that the discriminable range and the identification determination result range overlap, and
the imaging condition setting step sets an imaging condition by using the searched imaging condition setting rule,
wherein the imaging condition setting rule is generated based upon a distance and a direction of movement of the identification determination result range that satisfies a predetermined condition.

5. The method according to claim 4, further comprising, a second identity result range generating step of generating a new discriminable range in which the object is discriminable under the imaging condition set by the imaging condition setting step;
a second imaging condition setting rule generating step of generating a new identification determination result range in which the objects are determined as identical by using the image captured under the imaging condition;
a second imaging condition setting step of generating a new imaging condition setting rule that is a rule for setting the imaging condition by using the new discriminable range and the new identification determination result range and searching for the new imaging condition setting rule under which the new discriminable range and the new identification determination result range overlap; and
a second imaging condition setting step of setting the imaging condition by using the searched new imaging condition setting rule.

6. The imaging condition setting method according to claim 4, wherein the imaging condition is one or a combination of the position of an image pickup unit which images the object, the posture of the image pickup unit, the field angle of the image pickup unit, the resolution of the image captured by the image pickup unit, the position of an illumination that radiates light to the object, the posture of the illumination.

7. A non-transitory computer-readable storage medium that stores a program causing a computer of an imaging apparatus which allows setting of an imaging condition for an image to be used for discriminating an object to perform:

an object discriminating step of discriminating the object by using a plurality of images captured under a plurality of imaging conditions;

a discriminable range generating step of generating a discriminable range that is a range of the plurality of imaging conditions under which the object is discriminable;

an identification determination result range generating step of generating an identification determination result range that is a range of the plurality of imaging conditions under which the objects are determined as identical;

an imaging condition setting rule generating step of generating an imaging condition setting rule that is a rule for setting an imaging condition by using the discriminable range and the identification determination result range; and an imaging condition setting step of setting an imaging condition by using the imaging condition setting rule, wherein the imaging condition setting rule generating step generates an imaging condition setting rule that is a rule for setting an imaging condition by using the discriminable range and the identification determination result range and searches for the imaging condition setting rule that the discriminable range and the identification determination result range overlap, and the imaging condition setting step sets an imaging condition by using the searched imaging condition setting rule, wherein the imaging condition setting rule is generated based upon a distance and a direction of movement of the identification determination result range that satisfies a predetermined condition.

8. The non-transitory storage medium according to claim 7, further comprising a second identity result range generating step of generating a new discriminable range in which the object is discriminable under the imaging condition set by the imaging condition setting step;

a second imaging condition setting rule generating step of generating a new identification determination result range in which the objects are determined as identical by using the image captured under the imaging condition;

a second imaging condition setting step of generating a new imaging condition setting rule that is a rule for setting the imaging condition by using the new discriminable range and the new identification determination result range and searching for the new imaging condition setting rule under which the new discriminable range and the new identification determination result range overlap; and a second imaging condition setting step of setting the imaging condition by using the searched new imaging condition setting rule.

9. The apparatus according to claim 1, wherein the predetermined condition is a condition where one identification determination result range and the discriminable range overlap.

10. The apparatus according to claim 1, wherein when at least two distances and directions of movement of the identification determination result range satisfy a predetermined condition, an imaging condition setting rule is searched which satisfies a second condition.

* * * * *